May 20, 1969     J. MERCIER     3,444,880

PRESSURE CONTROL UNIT FOR HYDRAULIC SYSTEMS

Original Filed Jan. 31, 1963     Sheet 1 of 5

FIG:1

INVENTOR
JEAN MERCIER
BY
ATTORNEY

INVENTOR
JEAN MERCIER

INVENTOR
JEAN MERCIER
BY
ATTORNEY

United States Patent Office 3,444,880
Patented May 20, 1969

3,444,880
PRESSURE CONTROL UNIT FOR HYDRAULIC SYSTEMS
Jean Mercier, 501 Bloomfield Ave., Caldwell, N.J. 07006
Original application Jan. 31, 1963, Ser. No. 255,401, now Patent No. 3,294,104, dated Dec. 27, 1966. Divided and this application Nov. 9, 1966, Ser. No. 593,114
Int. Cl. F15b 21/00
U.S. Cl. 137—108    9 Claims

ABSTRACT OF THE DISCLOSURE

This invention relates to the art of control units, and more particularly to a control unit which includes a discharge valve that is controlled by a pilot valve, and resilient means are provided which react against the pilot valve normally to retain the latter in closed position at which time the discharge valve will also be closed. As the pressure in the system rises toward a first predetermined value, the force exerted by the resilient means against the pilot valve will be reduced and when the system pressure reaches such first predetermined value the pilot valve will be actuated to effect opening of the discharge valve. When the discharge valve has opened to relieve the pressure in the system, the force exerted by said resilient means against the pilot valve will be in-increased whereby when the system pressure has fallen to a second predetermined value, the pilot valve will again be actuated to effect closing of the discharge valve.

---

This application is a division of copending application Ser. No. 255,401, filed Jan. 31, 1963, now Patent No. 3,294,104.

As conducive to an understanding of the invention, it is noted that where discharge valves for hydraulic systems operate to relieve the pressure when it reaches a predetermined amount and then close when the pressure has fallen to a lower predetermined amount and the range between such two pressures is great, the utilization of such a discharge valve is extremely limited, for it may not be capable of use in systems in which the operating pressure must be maintained within close tolerances.

It is accordingly among the objects of the invention to provide a control unit which will relieve the pressure in a hydraulic system when it reaches a predetermined amount and which will permit recharge of the system to increase the pressure at an amount but slightly less than the pressure at which the system discharges, which control unit is relatively simple in construction and automatic in operation and is not likely to become deranged even with long use.

According to the invention from its broader aspect, the control unit includes a discharge valve which is controlled by a pilot valve, and resilient means are provided which react against the pilot valve normally to retain the latter in closed position at which time the discharge valve will also be closed. As the pressure in the system rises toward a first predetermined value, the force exerted by the resilient means against the pilot valve will be reduced and when the system pressure reaches such first predetermined value the pilot valve will be actuated to effect opening of the discharge valve. When the discharge valve has opened to relieve the pressure in the system, the force exerted by said resilient means against the pilot valve will be increased whereby when the system pressure has fallen to a second predetermined value, the pilot valve will again be actuated to effect closing of the discharge valve.

Figure 1:
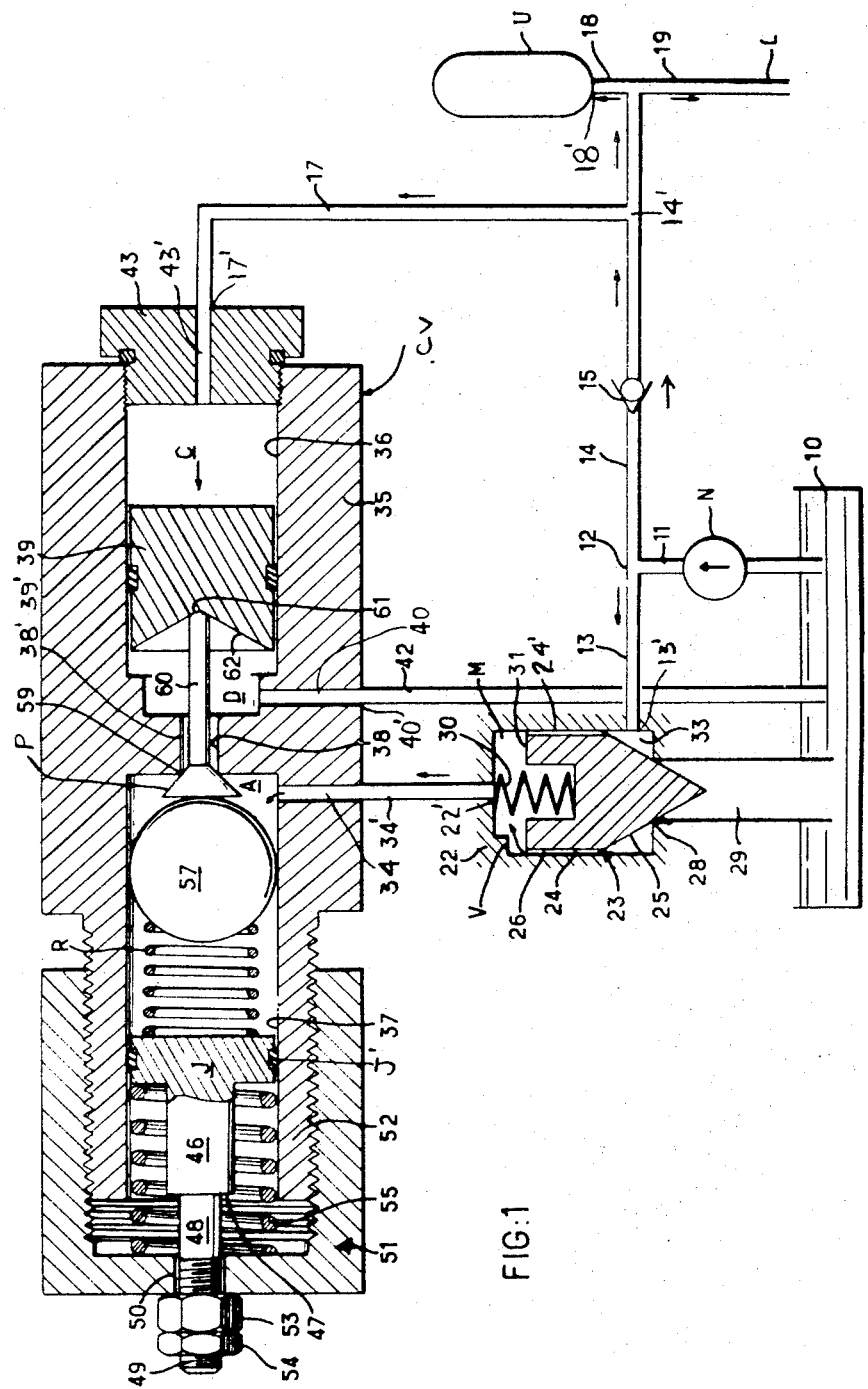
Figure 2:
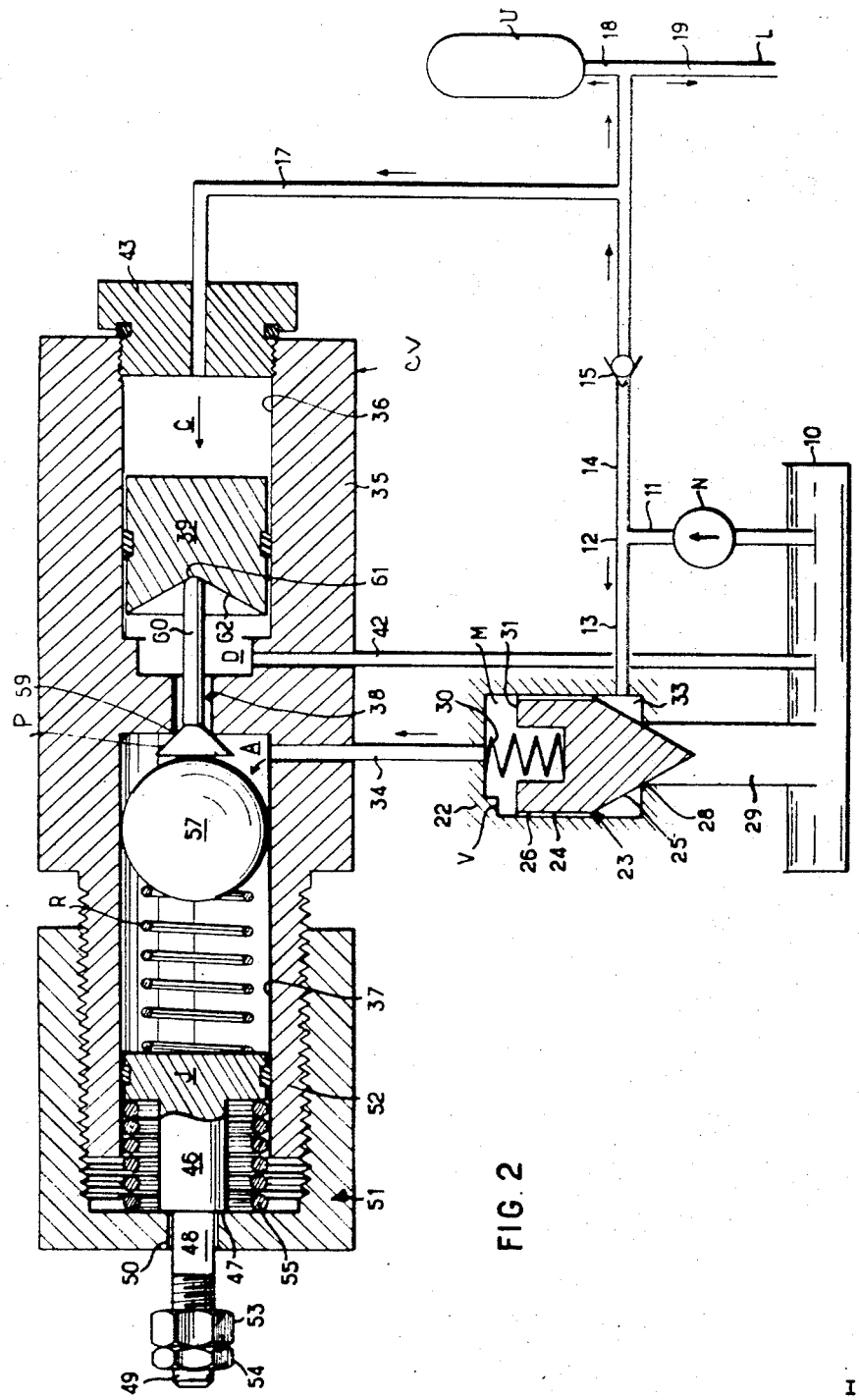
Figure 3:
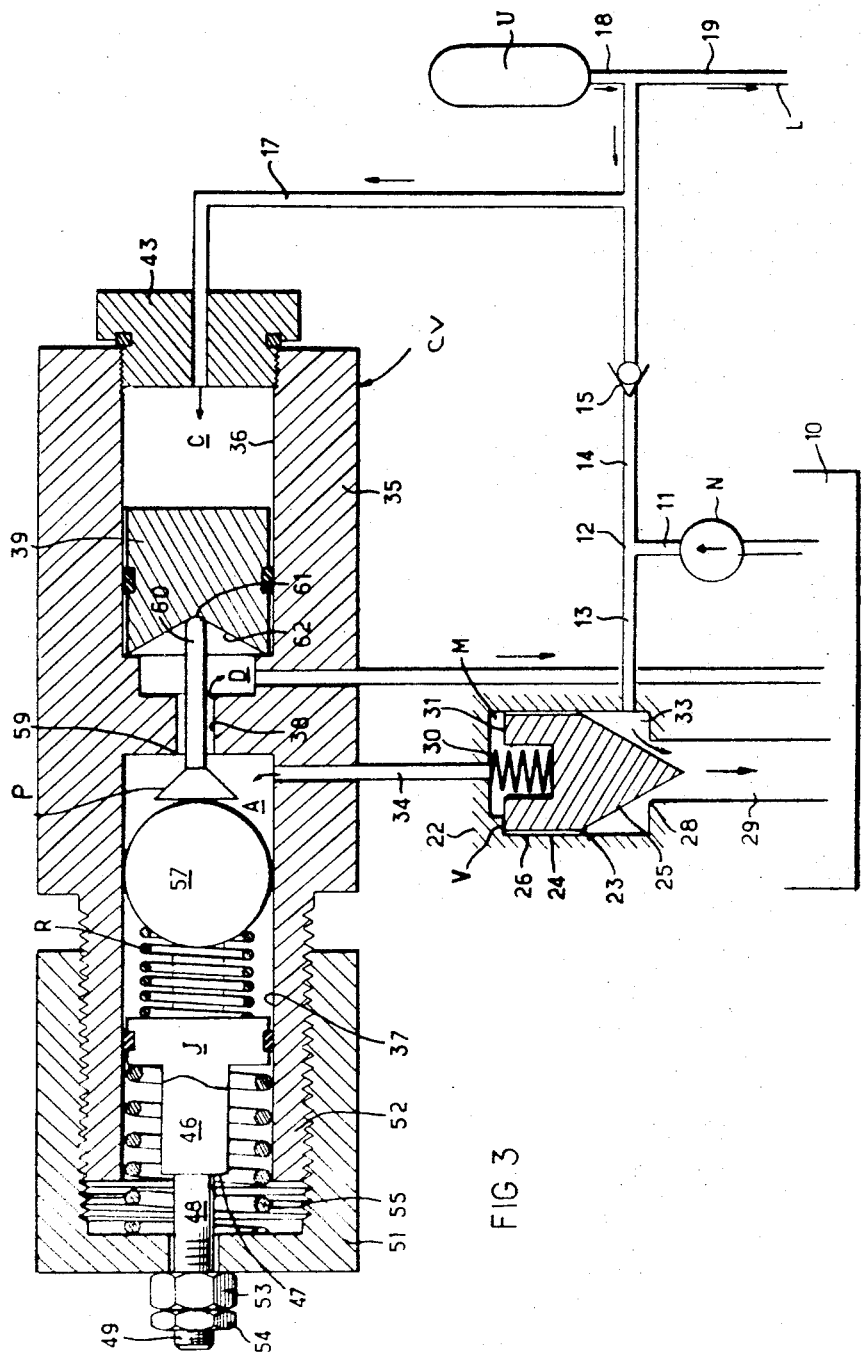
Figure 4:
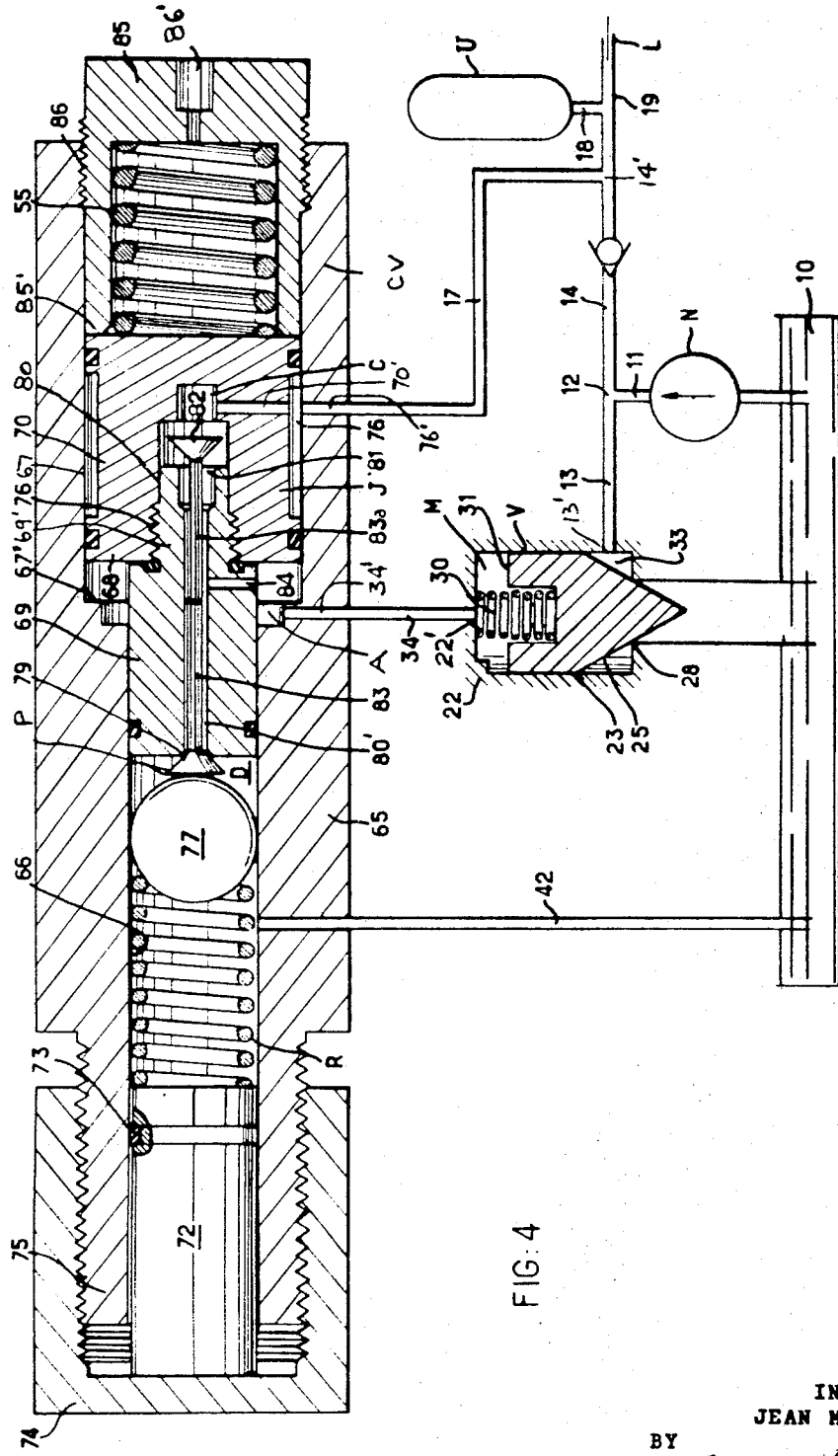
Figure 5:
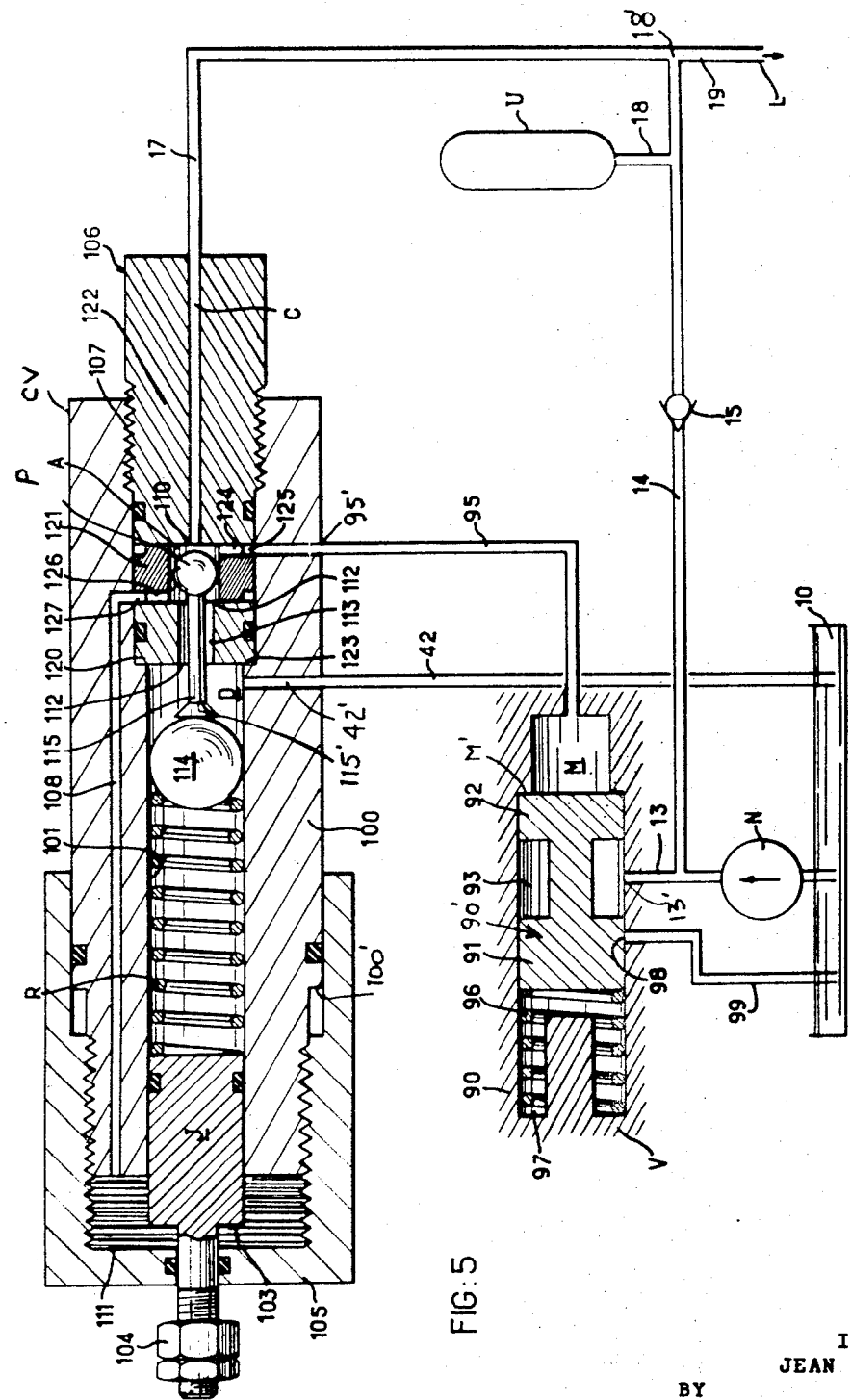

In the accompanying drawings in which is shown one or more of various possible embodiments of the several features of the invention, FIG. 1 is a view showing one embodiment of the invention partly in longitudinal cross section, FIGS. 2 and 3 are views similar to FIG. 1 showing the embodiment of FIG. 1 in various stages of operation, and FIGS. 4 and 5 are views similar to FIG. 1 of other embodiments of the invention.

Referring now to the drawings, in the embodiment shown in FIGS. 1 to 3 the control unit which includes a main discharge valve V and a control valve CV is incorporated into a hydraulic system including a pump N, a reservoir 10, a pressure accumulator U and a use circuit L.

The pump N has its inlet end connected to the reservoir 10 and its outlet end connected through line 11 to junction 12 which in turn is connected to lines 13 and 14. The line 13 is connected to the pressure inlet port 13' of the main discharge valve V. The line 14 is connected through one-way valve 15 to junction 14', the valve 15 permitting flow only from line 14 to junction 14'. The junction 14' is connected by line 17 to control port 17' of control valve CV and by lines 18 and 19 to the fluid port 18' of pressure accumulator U which may be of any conventional type such as that shown in U.S. Patent No. 2,931,392, and to the use circuit L to be operated by the hydraulic system.

The main discharge valve V has a closed hollow cylindrical body 22 in which a piston 23 is slidably mounted. The piston 23 has a cylindrical portion 24 and a conical portion 25. The cylindrical portion 24 is centered in the bore of the cylindrical body 22 by means of spaced parallel ribs 24' on the outer surface of the cylindrical portion and extending parallel to the longitudinal axis thereof, the spaces between the ribs 24' defining passages 26. The conical portion 25 of the piston 23 is designed to seat on the mouth 28 of a line 29 which extends into the reservoir 10, said mouth 28 defining a discharge port.

The piston is normally retained in closed position with respect to the seat 28 by means of a coil spring 30 positioned in the bore of the cylindrical body 22 and reacting against the piston 23, as is clearly shown in FIG. 1. The portion of the bore of the cylindrical body 22 between the piston and the end of the discharge valve defines a control chamber M and the portion of the bore between the cylindrical portion 24 of the piston and the seat 28 when the piston is in closed position defines a chamber 33 in communication with the port 13'.

The control valve CV comprises an elongated body portion 35 having two cylindrical bore portions 36, 37 therein in communication with each other through a passageway 38 of relatively small cross section extending through a wall 38' between the bores 36, 37.

Slidably mounted in the bore 36 is a piston 39 encompassed by a seal ring 39' and which defines a control chamber C on the outer side of the piston and a discharge chamber D on the inner side of the piston. The outer end of bore 36 is closed by means of a threaded plug 43 which has an axial bore 43' therethrough, the outer end of which defines the control port 17'. The discharge chamber D is connected through transverse passageway 40, port 40' and line 42 to the reservoir 10.

The end of the body portion 35 associated with the bore 37 is of reduced outer diameter as at 52 and is externally threaded to receive an internally threaded control cap 51, the latter having an axial bore 50 through the end wall thereof.

Slidably mounted in the bore 37 is an adjustment piston J encompassed by a sealing ring J'. The piston J has a stem 46 of reduced diameter as at 48 at its outer end defining an annular shoulder 47, the reduced diameter portion 48 being externally threaded as at 49 at its outer end and extending through the bore 50 of the cap 51, a nut 53 and a lock nut 54 being screwed on such threaded end 49. The nut 53 and the shoulder 47 are arranged on opposite sides of the end wall of the cap 51 and define two stops which cooperate with said end wall to determine two extreme positions of the stroke of the piston J in the bore 37.

The piston J is normally retained in its innermost position in the bore 37 by means of a coil spring 55, compressed between the piston J and the end wall of the cap 51. An additional spring R, which is weaker than the spring 55, is also positioned in bore 37 on the other side of the piston J, the spring reacting against the piston J and a ball 57 located in bore 37 and of diameter less than the diameter of said bore 37 so that it is freely movable therein, said ball 57 reacting against a pilot valve P. It is to be noted that the ball 57 does not constitute a tight barrier in the bore 37, but permits leakage of fluid past the same during operation of the unit.

The pilot valve P is a substantially frusto-conical member having its tapering wall adapted to be moved against the end 59 of the passage 38 which defines a seat for the pilot valve. The portion of the bore 37 between ball 57 and the wall 38' defines a chamber A which is connected by transverse passageway 34 and line 34' to a port 22' leading into the chamber M of the discharge valve V.

The pilot valve P has a stem 60 secured thereto which extends axially through the passage 38 with play since the diameter of the stem 60 is less than that of the passage 38 and the end 61 of the stem 60 rests against the bottom of a conical cavity 62 provided in the inner end of the piston 39.

It is to be noted that when the piston J is in its extreme position to the left, referring to FIG. 1, so that the shoulder 47 is resting against the end wall of cap 51, the coil spring R will have a predetermined tension which may be adjusted by rotation of the cap 51 for the purposes hereinafter set forth.

When the piston J is in its innermost position in bore 37 or its extreme position to the right, determined by the abutment of nut 53 against the outer surface of the end wall of cap 51, the coil spring R will have a different and greater predetermined tension and this tension is adjustable by rotation of the nuts 53, 54.

In the operation of the equipment shown in FIG. 1, when the pump N is energized, fluid under pressure will be forced through line 13, port 13' into chamber 33 of discharge valve V and then through the passageways 26 into chamber M and through the line 34' into the chamber A of the control valve CV to increase the pressure in such chamber A. Due to the fact that the cross sectional area of the upper end of the piston 24 defined by the wall 31 is greater than the useful cross sectional area of the conical portion 25 determined by the diameter of seat 28 and in addition, due to the force exerted by coil spring 30, the discharge valve V will be in its closed position as shown.

Fluid from the pump N will also flow through line 14, one-way valve 15 to junction 14' and thence through line 17 into control chamber C of the control valve and through line 18 to charge the accumulator U and also through line 19 to the hydraulic circuit to be operated.

As long as the pressure in the system remains below a predetermined amount the control unit will be in the position shown in FIG. 1, i.e., the discharge valve V will be in closed position and the pilot valve P will be seated against its seat 59.

As the pressure in chamber A increases, the fluid will flow past the ball 57 and react against the right hand face of piston J and as the pressure in chamber A rises above a predetermined amount based on the tension of coil spring 55, the piston J will be moved to the left until the shoulder 47 abuts against the end wall of the cap 51 as shown in FIG. 2. At this time the coil spring R will have extended, as shown in FIG. 2, with the pilot valve P still in closed position.

With further build up of pressure in the system, the pressure in chamber C will rise and exert a force against the piston 39 to tend to move the latter to the left. When such pressure has reached a predetermined value sufficient to overcome the force exerted by spring R and the pressure in chamber A reacting against pilot valve P, the piston 39 will move to the left and through the valve stem 60 to move the pilot valve P off its seat 59. It is to be noted that the effective area of piston 39 against which the fluid pressure will react is much greater than the effective area of pilot valve P.

It is apparent that by adjusting the cap 51, the tension on spring R may be varied and hence the pressure at which the valve P will move off its seat may be varied.

When valve P moves off its seat 59, the chamber A will be placed in communication with the reservoir 10 through the passageway 38 and line 42.

As a result of the opening of chamber A, the fluid pressure in bore 37 will be reduced and hence the piston J will move to the right under the urging of coil spring 55 until the nut 53 abuts against the outer surface of the end wall of the cover 51. Due to the relatively small cross section of the passageway 38, a dashpot effect will be created which will avoid any sudden movement. At this time the coil spring R will have again been compressed as shown in FIG. 3.

The opening of chamber A as above described, will also cause the pressure in chamber M of discharge valve V to drop and since the pump N is still operating, forcing fluid under pressure into chamber 33, the piston 23 will be moved away from its seat 28 providing a path for the fluid from the pump N through line 29 back into the reservoir 10.

At this time since the pressure in the accumulator U will be reacting against the one-way valve 15, the latter will be in closed position.

At this time, the pressure in the chamber C, due to the charge in accumulator U, will still be sufficient to retain the pilot valve P in open position even though the spring R has again been compressed. This is clearly shown in FIG. 3. As the accumulator U feeds fluid under pressure to the system, the pressure will drop in line 17 and hence in chamber C of control valve CV. When the pressure has dropped below a predetermined value so that the force exerted against the piston 39 is not able to overcome the force of the compressed spring R, the pilot valve P will again be moved to the right against its seat 59 to close the passageway 38, as shown in FIG. 1. The discharge valve V will again close due to the build up of pressure in chamber M and permit the pump N to feed fluid under pressure through the line 15 into the accumulator, the use system L and the control chamber C in the manner previously described.

It is to be noted that the opening of the pilot valve P which in turn causes the discharge valve V to open to prevent rise of pressure in the system above a predetermined value, takes place after the spring R has had its tension reduced as shown in FIG. 2. It is also to be noted that when the pilot valve P moves from the open position shown in FIG. 3 to the closed position shown in FIG. 1, the spring R is exerting greater tension.

As a result of the arrangement shown, the difference between the pressure at which the discharge valve V will open and the pressure at which it will close may be relatively small, in some cases up to three or four percent of the desired pressure instead of the fifteen or twenty percent which is customarily necessary in order for the conventional discharge valves to function.

As a result of the reduction of the pressure drop required between discharge and recharge of the accumulator, the system herein described produces much greater sensitivity in operation than is presently available which is desirable and sometimes necessary in numerous applications.

The embodiment shown in FIG. 4 is similar in many respects to the embodiments shown in FIGS. 1 to 3 and corresponding parts have the same reference numerals.

In the embodiment shown in FIG. 4, the control valve CV has a body portion 65 with two longitudinally aligned cylindrical bores 66 and 67, the bore 66 being of smaller diameter than the bore 67. Slidably mounted in the bores 66, 67 is the adjustment piston J which has portions 69 and 70 slidable in the bores 66 and 67 respectively, said portion 69 having a reduced diameter extension 69' which is screwed into an axial recess 80 in the cylindrical portion 70 of the piston J, the larger diameter portion 70 defining an annular shoulder 68.

Positioned in the outer end of bore 66 is a cylindrical plug 72 encompassed by an annular gasket 73, the end of the plug reacting against the end wall of a cup-shaped cap 74 screwed on the externally threaded end 75 of the body portion 65. The outer end of bore 67 is closed by means of a cup-shaped plug 85 which has an externally threaded portion 86 screwed in the correspondingly internally threaded end portion of the bore 67 as is shown in FIG. 4.

Positioned in the bore 66 is a spring R compressed between the inner end of plug 72 and a ball 77 of diameter less than the diameter of the bore 66. The ball 77 is urged by the spring R against a pilot valve P to retain the latter against its seat 79, the bore 66 being connected by line 42 to the reservoir 10. The plug 72 and the end of piston J define a chamber D. A chamber C is located at the end of the axial recess 80 in piston portion 70 and chamber C is connected through lateral passageway 70' in portion 70 to an elongated annular groove 76 in the periphery of the piston portion 70, appropriate seal rings being provided at each end of the groove 76 to prevent leakage. The annular groove 76 is in communication through a transverse passageway 76' with line 17 which leads to junction 14'. The inner end of the bore 67 of the body portion 65 is of reduced diameter defining an annular chamber A and chamber A is connected through transverse passageway 34' and line 34 to the port 22' of discharge valve V which leads into the chamber M. The reduced diameter portion of bore 67 defines a shoulder 67' against which the shoulder 68 defined by the larger portion 70 of the piston J may abut to limit the inward movement of such piston J under the urging of coil spring 55 which is compressed between the end wall of plug 85 and the adjacent end of the piston J. It is to be noted that the plug 85 has a recess in which the spring 55 is contained and the inner end 85' of the plug 85 defines a stop for the piston J, as is shown in FIG. 4 to limit the outward movement of the piston to the right, such movement being controlled by the setting of the plug 85.

The portion 69 of the piston J has an axial bore 80' therethrough leading into the chamber C in portion 70, the axial bore 80 having a transverse pasageway 84 which is in communication with the chamber A. The pilot valve P has a stem 83 of smaller diameter than the bore 80' and which extends thereinto; a second stem 83a is also positioned in the bore 80' and is also smaller diameter than the latter and mounts at its outer end located in the chamber C, a valve head 82 designed to seat on the enlarged diameter end 81 of bore 80'. The length of the stems 83 and 83a are such that when one of the valve heads P or 82 is seated, the other will be spaced from its seat.

It is to be noted that the coil spring 55 is stronger than the spring R and normally the piston J will be moved to the left so that its shoulder 68 will be against the shoulder 67'.

The operation of the embodiment shown in FIG. 4 is similar in many respects to the operation of the embodiment shown in FIGS. 1 to 3. It will be noted that the passages 26 provided in the discharge valve V of FIGS. 1 to 3 are not required in the embodiment of FIG. 4.

In the operation of the unit shown in FIG. 4, as the pump N forces fluid under pressure into the system, such fluid under pressure will enter the chamber 33' through line 13 and also flow through line 14 to charge the accumulator U and also enter the chamber C and pass through such chamber, through bore 80' and passageway 84 into chamber A. The fluid under pressure in chamber A will pass through passageway 34' and line 34 into the chamber M of the discharge valve V reacting against the surface 31 of the piston 23 therein and this force together with the force of the spring 30 will retain the piston 23 in closed position against its seat 28, even against the pressure in chamber 33. At this time the spring R will be in its compressed position and the piston J will be in its position to the left against shoulder 67'.

As the pressure in the system builds up, there will be an increase in the pressure in chambers C and A. Such increase in pressure in chamber A will force the piston J to the right compressing the spring 55, movement of the piston J being facilitated by the port 86' in plug 85 which serves as a vent. The piston J will move to the right until it abuts against the end 85' of plug 85 and the tension on the spring R will be reduced. With further increase in pressure to a predetermined value which also will be applied through bore 80' against the seated pilot valve P, since the force retaining the latter seated has been reduced by reason of the extension of the spring R when piston J moves to the right, such pilot valve P will move off its seat 79. As a result, the chambers C and A will discharge through bore 80', bore 66 and line 42 into the reservoir thereby permitting the piston J to be moved to the left by reason of the tension of coil spring 55, and the spring R will again be compressed. However, as the pressure in chamber C reacting against the effective area of valve head 82 will be greater than that in bore 66 reacting against the effective area of valve P, the valve head 82 will now be seated and through the stems 83a and 83, the valve P will remain spaced from its seat. Reduction in fluid pressure in chamber A will cause corresponding reduction of pressure in chamber M and hence the pressure in chamber 33 will overcome the force exerted by the coil spring 30 so that the piston 23 of discharge valve V will move away from its seat 28 thereby permitting the pump N to discharge into the reservoir 10.

In the manner previously described with respect to the embodiments in FIGS. 1 to 3, during use of the accumulator U when the pressure in chamber C drops below a predetermined amount, the force exerted by the now compressed spring R will be sufficient to move the pilot valve P back on to its seat 79 to close the bore 80' and the operation will again be repeated as the pressure varies.

In the embodiment shown in FIG. 5 the control unit comprises a main discharge valve V which has a body portion with a bore therein in which a piston 90' is slidably mounted. The piston 90' has an elongated annular groove 93 between the ends thereof defining two heads 91 and 92. The annular chamber defined by groove 93 is connected by line 13 to the outlet end of a pump N, the inlet end of which is connected to reservoir 10.

Between the piston head 92 and the adjacent end of the body 90, a control chamber M is defined which is connected by line 95 to port 95' of control valve CV. The chamber M is formed by a reduced diameter portion of the bore of the body 90 which forms a shoulder M' and the piston 90' is normally retained against shoulder M' by means of a coil spring 96 positioned in the bore of the discharge valve and reacting against the head 91 of the piston. With the piston seated against the shoulder M', a discharge port 98 in valve body 90 is closed by head 91, said port 98 being connected by line 99 to the reservoir 10. The port 98 is closed when the pressure in the chamber M is below a predetermined value. When the pressure in chamber M rises to a predetermined amount, the piston 90' will be moved to the left from the piston shown in FIG. 5 against the tension of the coil spring 96 and at such time the pressure inlet port 13' and discharge port 98 will be connected through chamber 93, causing the pump N to force fluid back into the reservoir 10.

The control valve CV has a body portion 100 with an axial bore 101. An adjustment piston J is slidably mounted in the bore 101 and has a reduced diameter portion which extends through an opening in the end wall of a cap 105 screwed on the end of the body 100. The reduced diameter end of piston J is threaded to receive nuts 104 and such reduced diameter portion defines an annular shoulder 103 at its root end, said shoulder 103 and nuts 104 forming two stops which determine the inward and outward position of the piston J with respect to the end wall of cap 105.

The cap 105 and the adjacent portion of the body portion 100 on which it is screwed, have complementary shoulder portions 100' which serve to limit the inward position of the cap. A chamber 111 is defined between the end of the body portion 100 and the end wall of the cap 105.

The bore 101 of the body portion 100 is in communication through transverse passageway 42' with line 42, leading to the reservoir 10. The piston J and a plug 106 positioned in the outer end of the bore of the member 100 define a chamber D therebetween.

As is clearly shown in FIG. 5, the plug 106 has three parts 120, 121 and 122. The part 120, which is adjacent the chamber D, is seated against an annular shoulder 123 and is encompassed by a suitable sealing ring. The part 121 is interposed between the part 120 and the part 122, the part 122 has an externally threaded portion which coacts with a correspondingly internally threaded portion 107 in the bore of the body portion 100 and hence when the part 106 is screwed into place it will properly position the parts 120 and 121. The part 120 has an axial bore 113 which leads into an axial bore in part 121 defining a chamber A, the diameter of chamber A being greater than that of bore 113 and forming an annular shoulder 112. The chamber A is connected through transverse passageways 124 and 125 to port 95' which in turn is connected by line 95 to the chamber M of the discharge valve. In addition, the chamber A is connected through passage 126, and an annular groove 127 to passageway 108 which is connected to the chamber 111.

A pilot valve P in the form of a ball of smaller diameter than the chamber A, is positioned in the latter and can be moved to the right against the seat 110 defined at the inner end of passageway C in part 122, which passageway is connected by line 17 to junction 18' or against the seat 112 of a larger cross section than seat 110 and formed at the outer end of bore 113 which leads to chamber D. An adjustment spring R is positioned in the bore 101 between the piston J and a ball 114 of smaller diameter than the diameter of bore 101 and the ball 114 reacts against a head 115' to which valve stem 115 is connected, the latter extending with play through the bore 113 and reacting against the ball valve P.

In the embodiment of FIG. 5, the adjustment of the calibration of the spring R is effected by movement of the piston J without the resilient means such as spring 55 of FIGS. 1 to 4, for example.

When the system of FIG. 5 is initially started the spring R will be extended so that the valve P will be against opening 110 to close the latter and the annular shoulder 103 of piston J will be seated against the end wall of cap 105. At this time the chamber M of the discharge valve V is connected to the reservoir 10 through line 95, port 95', passageways 125, 124, chamber A, bore 113, chamber D and line 42. Consequently, no pressure will be applied to chamber M and the piston 90' will be in the position shown, closing the discharge port 98. At this time also, the chamber 111 of the control valve CV will be connected to the reservoir 10 through passageway 108, passageways 127 and 126, chamber A, bore 113, chamber D and line 42. As a result, there will be no fluid pressure in the chamber 111 and hence the piston J will be in its left hand position with the spring R extended.

As the pressure in the system increases it will rise in line 17 and hence the valve P will be moved to the left away from its seat 110 against the relatively small force exerted by the extended spring R and such valve P will seat against the valve seat 112, closing the bore 113. This will occur when the pressure in the system has reached a predetermined value. At such time fluid under pressure will flow through line 17 into chamber A and thence through port 95' and line 95 into chamber M of the discharge valve V to move the piston 90' thereof to the left to connect ports 13' and 98 so that the pump N will discharge into the reservoir 10. In addition, fluid under pressure will flow from chamber A through passageway 108 into chamber 111 and react against the shoulder 103 of the piston J, moving the piston to the right until the nut 104 strikes the outer surface of the end wall of the cap 105. As a result, the spring R will be compressed ready for the recharging cycle.

As the pressure in line 17 decreases due to the utilization of the accumulator, the pressure in chamber A will drop and hence the pilot valve P will be moved off the seat 112 by reason of the force exerted by the compressed coil spring R and again close the seat 110. The operation will then repeat in the manner above set forth.

With the equipments above described, it is apparent that once the discharge valve has opened when the system pressure has reached a predetermined amount, to prevent further increase in pressure, since the resilient means R which controls the pilot valve P will have had its force materially increased, a slight decrease in the pressure in the system, will cause a reversal of operation so that the discharge valve can then close to permit the pressure again to build up. It is therefore apparent that the range between discharge and recharge can be maintained within small limits which may be extremely important if not necessary in many applications of hydraulic control devices.

As many changes could be made in the above constructions and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A control unit for maintaining the pressure in a hydraulic system within predetermined limits comprising a control valve having a body portion with a bore therein, a piston slidably mounted in said bore and movable between two extreme positions, a chamber in said bore having two opposed wall surfaces, said piston forming one wall of said chamber, a passageway leading into said chamber, a pilot valve associated with the end of said passageway in said chamber, resilient means in said chamber reacting against said piston and said pilot valve and normally urging said pilot valve to close said passageway, means to urge said piston to one of its extreme positions to compress said resilient means, a discharge port in said body portion in communication with said chamber, a pressure control chamber in said bore, said piston defining a wall of said pressure control chamber, means providing communication between said passageway and said pressure control chamber, means to apply fluid under pressure into the other end of said passageway, an additional pilot valve controlling said other end of said passageway and normally open when said first pilot valve is closed, a discharge valve having a pressure inlet port, a discharge port and a control chamber, a piston in said discharge valve in communication with said control chamber and normally retaining the discharge port closed and a line connecting said pressure control chamber and said discharge valve control chamber.

2. The combination set forth in claim 1 in which the means to urge said piston to one of its extreme positions comprises a coil spring reacting against said piston to move it in direction opposed to the direction of movement imparted to the piston by said resilient means, said resilient means comprises a coil spring of lesser force than said first coil spring.

3. The combination set forth in claim 1 in which said piston has a chamber therein, said passageway extends through said piston from said first chamber into said piston chamber, said additional pilot valve is in said piston chamber, and a rod extends through said passageway, said pilot valves being secured to the ends of said rod.

4. The combination set forth in claim 3 in which the effective area of the end of the passageway in the piston chamber is greater than the effective area of the end of the passageway in the first chamber.

5. The combination set forth in claim 1 in which resilient means in said discharge valve chamber normally urges said piston therein to closed position, opposed portions of the piston are exposed to the pressure in the control chamber of the discharge valve and to the pressure through the pressure inlet port of the discharge valve and the area of the piston exposed to the pressure in the control chamber of the discharge valve is greater than that exposed to the pressure through the pressure inlet port of the discharge valve.

6. A control unit for maintaining the pressure in a hydraulic system within predetermined limits comprising a control valve having a body portion with a bore therein, a piston slidably mounted in said bore and movable between two extreme positions, a chamber in said bore having two opposed wall surfaces, said piston forming one wall of said chamber, a pressure chamber in said body portion, a passageway through said other wall and between said chambers, a pressure inlet leading into said pressure chamber, valve means in said pressure chamber adapted alternately to seal said pressure inlet and the end of said passageway leading into the pressure chamber, resilient means in said first chamber reacting against said piston and said valve means and normally urging the latter to seal said pressure inlet, said first chamber having a discharge port, means to urge said piston to one of said extreme positions to compress said resilient means, a discharge valve having a pressure inlet port, a discharge port and a control chamber, a piston in said discharge valve in communication with said control chamber and normally retaining the discharge valve in closed position and a line connecting said control valve pressure chamber and said discharge valve control chamber.

7. The combination set forth in claim 6 in which a rod extends through said passageway, said valve means in said pressure chamber being moved by one end of said rod and said resilient means reacting against the other end of said rod.

8. The combination set forth in claim 6 in which the means to urge said piston to one of said extreme positions comprises a chamber in said bore, one end of said piston being positioned in said chamber, and a passageway extending between said chamber and said pressure chamber.

9. The combination set forth in claim 6 in which said discharge valve comprises a body portion having a bore, said piston having an elongated annular groove between its ends, resilient means reacts against one end of said piston to urge it toward said control chamber, said pressure inlet portion being in communication with said annular groove, said discharge port being normally closed and connected to said inlet port when the pressure in said control chamber moves the piston against the force exerted by the resilient means in said discharge valve.

References Cited

UNITED STATES PATENTS

| 2,447,820 | 8/1948 | Schultz | 137—108 |
| 2,474,122 | 6/1949 | Schneck | 137—108 |
| 3,336,933 | 8/1967 | Mercier | 137—108 |

LEONARD D. CHRISTIAN, *Primary Examiner.*